3,488,198
FILLED MILK PRODUCT
Robert H. Bundus, Riverside, Ill., assignor to Beatrice Foods Co., Chicago, Ill., a corporation of Delaware
No Drawing. Filed Mar. 1, 1967, Ser. No. 619,605
Int. Cl. A23c *11/00*
U.S. Cl. 99—63                              10 Claims

ABSTRACT OF THE DISCLOSURE

A filled milk product with a rich mouth taste is prepared by employing a water-in-oil emulsifier together with vegetable fat and skim milk.

---

The present invention relates to filled milk products.

Filled milk is a mixture containing non-fat milk solids and vegetable fat simulating whole milk or cream. It also can contain flavors and colors for taste or functional purposes.

Whole milk possesses full flavor characteristics and a rich mouth feel. When vegetable fat is substituted for butterfat in making a filled milk it is necessary to include an emulsifier to obtain satisfactory emulsion stability.

Applicant has observed that whenever oil-in-water emulsifying agents are employed the resultant flavor and mouth feel are lacking in rich taste and the product tastes watery and oil-like. SGF–104, a conventional mixed mono and diglycerides (about 40–42% monoglycerides), is such an oil-in-water emulsifier.

Accordingly, it is an object of the present invention to prepare an improved filled milk.

Another object is to prepare a filled milk having full flavor and a rich mouth feel.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by employing water-in-oil emulsifiers with non-fat milk solids. It is surprising that such emulsifiers can be employed since they are not as efficient in forming stable emulsions as are oil-in-water emulsifiers. Nevertheless, the water-in-oil emulsifiers impart to the filled milk, a rich, full flavor, possessing creaminess and at the same time less of an oily taste. This is particularly unexpected, since normally oil-in-water emulsifiers are employed with low amounts of fat.

The water-in-oil emulsifier can either be added to skim milk as such, or it can be added to dry milk solids with more fat and water added to give the filled milk.

The preferred water-in-oil emulsifier is Myverol 18–07 which is essentially 90% glyceryl monostearate and 10% glyceryl distearate. There can also be employed glyceryl mono palmitate, glyceryl monostearate, propylene glycol monostearate, propylene glycol monooleate, propylene glycol mono palmitate, glyceryl monooleate, ethylene glycol monostearate, sorbitan monostearate, sorbitan, tristearate, sorbitan monooleate, sorbitan trioleate, sorbitan tallate, glyceryl monotallate.

There can also be added a small amount of lecithin such as lecithin IM, which contains cephalin as a part of the lecithin. Such a lecithin gives water-in-oil emulsions. It has been found that the use of Myverol 18–07 together with lecithin gives a product with better emulsion stability than when either is used alone.

As the vegetable fat there can be used coconut oil, cottonseed oil, palm oil, corn oil, soybean oil, hydrogenated cottonseed oil, hydrogenated soybean oil, peanut oil, olive oil.

Unless otherwise indicated, all parts and percentages are by weight.

The composition normally contains: 0.05 to 0.5% emulsifier; 1 to 10% fat; 5 to 10% skim milk solids; balance water.

For a creamier taste the fat can be up to 20% and to obtain a whipping cream flavor, up to 30% of the composition can be fat. The amount of emulsifier is not over 1%.

EXAMPLE I

|   | Percent |
|---|---|
| Skim milk | 96.65 |
| 92° coconut oil | 3.2 |
| Myverol 18–07 | 0.15 |

This mixture was heated to 150° F. to assure liquefaction of the monoglyceride and to pasteurize the skim milk. The mixture was held at 150° F. for 30 minutes, homogenized at 2000 p.s.i. and cooled to less than 40° F. and stored until ready for use. The product had good emulsion stability, full flavor characteristics and a rich mouth feel.

EXAMPLE II

|   | Percent |
|---|---|
| Dry milk solids (non fat) | 8.7 |
| Myverol 18–07 | 0.15 |
| 92° coconut oil | 3.2 |

This mixture was made up with sufficient water to give a 100% composition. The mixture was heated to 150° F., held there for 30 minutes, homogenized at 2000 p.s.i. and cooled to less than 40° F.

EXAMPLE III

|   | Percent |
|---|---|
| Skim milk | 96.6 |
| Soybean oil | 3.2 |
| Myverol 18–07 | 0.15 |
| Lecithin IM | 0.05 |

This mixture was heated to pasteurization temperature and pasteurized, as in Example I, homogenized cooled and stored. The product had excellent emulsion stability.

EXAMPLE IV

|   | Percent |
|---|---|
| Dry milk solids | 9.0 |
| Soybean oil | 3.2 |
| Myverol 18–07 | 0.15 |
| Lecithin IM | 0.05 |

These ingredients were mixed in water, the product pasteurized at 165° F., homogenized at 2500 p.s.i. and cooled.

EXAMPLE V

|   | Percent |
|---|---|
| Skim milk | 95.8 |
| Glyceryl monostearate | 0.2 |
| Cottonseed oil | 4.0 |

This mixture was heated to 160° F., pasteurized, homogenized at 1500 p.s.i., cooled to 40° F. and stored to give a stable product having full flavor characteristics and a rich mouth feel.

EXAMPLE VI

|   | Percent |
|---|---|
| Skim milk | 79.5 |
| Glyceryl monooleate | 0.5 |
| 92° coconut oil | 20.0 |

This mixture was heated to 160° F., pasteurized for 25 minutes at this temperature, homogenized at 2000 p.s.i.

and cooled to below 40° F. and stored to give a filled cream.

What is claimed is:

1. A filled milk product consisting essentially of water, milk solids non-fat, 1 to 30% of a vegetable fat and from 0.05 to 1% of a water-in-oil emulsifier wherein the emulsifier is selected from the group consisting of propylene glycol mono higher fatty acid esters, glycerol mono higher fatty acid esters, ethylene glycol mono higher fatty acid esters and sorbitan partial higher fatty acid esters.

2. A product according to claim 1 wherein the emulsifier is not over 0.5% and the fat is not over 20%.

3. A product according to claim 1 containing 0.05 to 0.5% emulsifier, 1 to 30% fat and the balance skim milk.

4. A product according to claim 3 wherein the fat is 1 to 10%.

5. A product according to claim 1 wherein there is additionally present a water-in-oil cephalin containing lecithin emulsifier in an amount not exceeding the fatty acid ester.

6. A product according to claim 1 wherein the emulsifier is a glycerol mono higher fatty acid ester, said fatty acid containing 16–18 carbon atoms.

7. A product according to claim 6 containing 1–10% fat.

8. A product according to claim 7 wherein the emulsifier is glyceryl monostearate.

9. A product according to claim 8 including cephalin containing lecithin in an effective amount but not exceeding the amount of glyceryl monostearate.

10. A product according to claim 9 wherein the glyceryl monostearate contains no more than about 10% by weight of glyceryl distearate.

References Cited

UNITED STATES PATENTS

| 1,958,295 | 5/1934 | Christenson et al. | 99—63 X |
| 2,407,027 | 9/1946 | Mason | 99—63 |

FOREIGN PATENTS 852,908  11/1960  Great Britain.

A. LOUIS MONACELL, Primary Examiner

D. M. NAFF, Assistant Examiner